W. C. SHEETS.
STACKING DEVICE.
APPLICATION FILED AUG. 29, 1921.
1,430,761.
Patented Oct. 3, 1922.
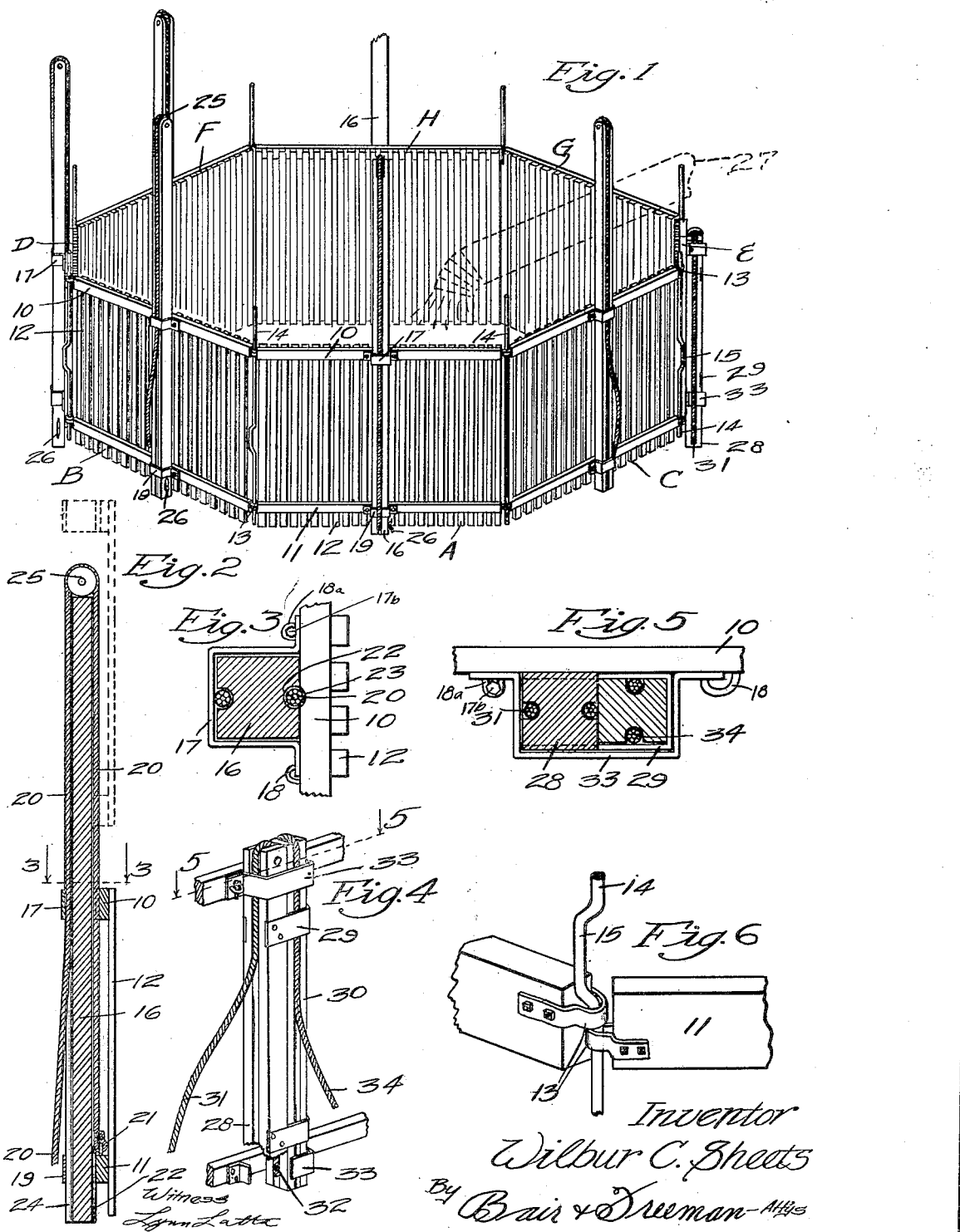
Inventor
Wilbur C. Sheets
By Bair & Freeman Attys Patented Oct. 3, 1922.

1,430,761

UNITED STATES PATENT OFFICE.

WILBUR C. SHEETS, OF AUDUBON, IOWA.

STACKING DEVICE.

Application filed August 29, 1921. Serial No. 496,507.

*To all whom it may concern:*

Be it known that I, WILBUR C. SHEETS, a citizen of the United States, and a resident of Audubon, in the county of Audubon and State of Iowa, have invented a certain new and useful Stacking Device, of which the following is a specification.

The object of my invention is to provide an apparatus for use with a threshing machine for catching and retaining the straw and chaff discharged from the machine, whereby the scattering of the straw by the wind is prevented.

A further object is to provide such a device having spaced upright posts and fence sections slidably mounted thereon, the sections being linked together in the form of a closed polygon.

A further object is to provide in such a device means for raising the fence sections upon the posts for increasing the height of the stack of straw.

Still a further object is to provide such a device wherein the sections are removable for increasing or decreasing the size of the enclosure.

A still further object is to provide such a device which may be used as a corral for milking cows or shearing sheep, one section to serve as a gate.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of my straw stacking device, the discharge pipe of a threshing machine being shown in dotted lines.

Figure 2 is a longitudinal sectional view through one of the supporting posts and a section of fence mounted thereon.

Figure 3 is a transverse, sectional view through the post taken on the line 3—3 of Figure 2.

Figure 4 is a perspective view of a modified form of a post used on one side of the device.

Figure 5 is a sectional view through the same taken on the line 5—5 of Figure 4; and Figure 6 is an enlarged, detail view of a portion of the rod used to link together the fence sections.

For convenience in illustrating, I have shown in Figure 1, an apparatus embodying my invention, which employs eight sections of fence. It will be understood that various numbers of sections can be used, thus varying the size of the stack to be built. Each section is composed of the horizontal, vertically spaced frame members 10 and 11 and the vertical slats 12. At the ends of the members 10 and 11 are the members 13, which form bearings for the rod 14. The bearings 13 at the end of one member 10 or 11 are arranged to register with the bearings 13 in the end of the corresponding adjacent member of the adjacent section. Through these registering bearings is passed the rod 14, which is bent at 15, forming an offset or crank portion, the purpose of which will be more fully explained hereinafter.

It will be seen that the sections, when linked together by the rods 14, will form a rigid structure which will not collapse inwardly or outwardly, but may be moved vertically, by the use of posts 16, which are of substantially twice the height of the fence sections. A flat sheet metal strip is bent to form a yoke 17 to receive the posts 16. One end of each upper yoke 17 of each section is pivotally fastened to the member 10 by an eyebolt 18. The other end of each yoke 17 has a slot 17$^a$ not shown, to receive another eyebolt 18$^a$ through which a headed pin 17$^b$ may be inserted to secure the yoke in position. A similar yoke 19 is fastened to the lower member 11 in any suitable way.

A rope 20 is fastened to the lower frame member 11 as at 21, between the slats 12 and the post 16. A groove 22 is cut lengthwise of the post 16 and a corresponding groove is cut through the frame member 10. A groove 24 is cut lengthwise of the post 16 on the opposite side from the groove 22. The rope passes up between the post and the groove 23, over a pulley 25 at the top of the post, and down through the groove 24 and under the sleeve 17. The purpose of this arrangement is seen when it is stated that it is desirable to raise the fence sections to a point where the lower sleeve 19 is substantially at the top of the post, the remainder of the fence projecting above the post practically its entire height. In order to retain the fence at any elevation, I have provided hooks 26 around which the rope may be wrapped.

In the practical use of my apparatus, the sections are conveyed to the place where the device is to be used, the posts 16 and rods 14 being removed, thus allowing the entire structure to be carried very compactly.

In order to set up the device, the fence sections are placed in an upright position and linked together with a rod 14, which is inserted from the lower side of the upper eyebolts and then slipped up to a position where it may be inserted from the upper side of the lower eyebolt. The ropes 20 are placed over the pulleys 25 and arranged in the slots 22 and 24. The posts are then inserted in the yokes 19 and the upper yokes 17 fastened in place about them.

In raising the fence, each section may be raised individually, or they may all be raised at once by the efforts of a number of men. In order to raise them individually the bearings 13 on both ends of one section, such as the one indicated at A in Figure 1, are arranged above the eyebolts in the adjacent sections B and C. The bearings in the alternate sections D and E are also arranged above the bearings in the alternate sections B, C, F and G. It will be noticed that the offset portions 15 are spaced upwardly from the lower bearings. The sections, A, D, etc., are first raised until the bearings meet the bent portions and then the sections B, C, etc., are raised until they are level with the sections A, D, etc.

It will be noted that the rods 14 are of sufficient length to reach substantially above the upper bearings, in order that these may not slip off the ends of the rods. When the sections are raised further, the bent portion 15 provides the rod slipping any further through the bearings, and the rod is thereby carried up with the slidable sections.

In Figure 1, I have shown a blower pipe or discharge pipe of a threshing machine at 27. Ordinarily the straw is allowed to discharge upon the open ground, but a moderate wind will cause it to be blown a considerable distance because of its extreme lightness. The result is a long slanting pile, which occupies much valuable space, deteriorates rapidly, and looks unsightly.

In my improved stacker, the blower pipe may be lowered below the level of the fence, thus preventing the escape of the straw, and any shape or size of stack may be built to a height of about three times that of the fence members.

As the fence is raised, the weight of the straw above will prevent the escape of the exposed straw below, and a very straight stack will be built, which is not likely to blow over and which is very compact.

In order to swing the blower pipe from side to side, I provide several of the posts in two sections, as shown in Figures 4 and 5, where 28 is a post that remains on the ground and has received in sleeves 29 a second post 30. A rope 31 is fastened to the post 30 at 32 and passes up between the posts and over a pulley in the top of the post 28 for raising the post 30. The fence frame members 10 and 11 have the sleeves 33 enclosing both posts and the rope and a rope 34 is fastened to the member 11 and received over a pulley in the top of the post 30 in the same manner as the rope 20. Thus the post 30 may be raised by the rope 31 and the fence raised by the rope 34.

My device may be used to stack bundles of oats or the like and by its use, the layers of bundles may be slanted downwardly from the center so as to shed water.

The device may also be used as a corral for sheep or cattle. In this case the section A, for instance, could be raised as a gate, and rods 14 of sufficient length could be used to allow the raising to the proper height.

Some changes may be made in the construction and arrangement of the various parts of my device, without departing from the essential features and purposes of my inventions, and it is my intention to cover by my claims, any modified forms of structure or use of mechanical equivalents, which may be reasonably included within their scope.

I claim as my invention:

1. A straw stacking device, comprising a plurality of spaced upright posts, straw retaining members slidably mounted on said posts, said members being linked together in the form of a closed polygon, and means carried by said posts for raising said straw retaining members.

2. A straw stacking device, comprising a plurality of spaced upright posts, straw retaining members slidably mounted on said posts, said members being linked together, and means carried by said posts for raising said straw retaining members.

3. A straw stacking device, comprising a plurality of posts, a straw retaining wall member arranged to slide upon each of said posts, said last members having their side edges linked together, and means mounted on each post for raising the straw retaining wall member on said post as specified.

4. In a straw stacking device, a plurality of posts spaced from each other, straw retaining members slidably mounted on said posts, pulleys in the upper ends of said posts, ropes over said pulleys, one end of said ropes being fastened to said straw retaining members for raising said members, said ropes being arranged so as to allow the straw retaining members to be raised until their lower portions are substantially on a level with the tops of the posts.

5. In a straw stacking device, a plurality of posts spaced from each other, straw retaining members slidably mounted thereon, eyebolts in the ends of said members, the eyebolts on the end of one member being arranged to register with the eyebolts on the end of the adjacent member, rods received through said eyebolts for linking said members together, said rods having offset portions for preventing the sliding of said rods from the eyebolts.

6. A straw stacking device, comprising a plurality of posts, a straw retaining wall member arranged to slide upon each of said posts, said last members having their side edges linked together, so as to permit sliding movement of one wall member relative to the adjacent wall member, and means mounted on each post for raising the straw retaining wall member on said post as specified.

7. In a device of the class described, a plurality of wall members having their edges linked together for permitting sliding movement of one wall member relative to the adjacent wall members and a support for each of the wall members, upon which support said wall members are permitted to slide.

8. In a device of the class described, a plurality of wall members having their edges arranged adjacent to each other, means on said wall members for linking them together so as to permit sliding movement of one wall member relative to the adjacent ones independent thereof and a support for each of the wall members, upon which support said wall members are permitted to slide.

WILBUR C. SHEETS.